Figure 1:
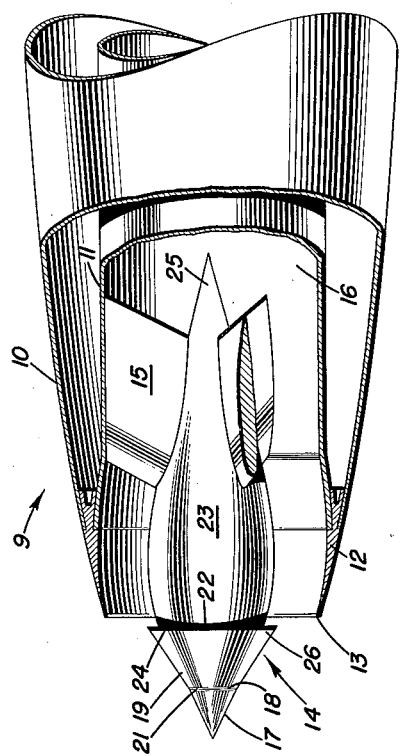

Aug. 8, 1961     R. S. RAE     2,995,007
RAMJET DIFFUSER
Filed Sept. 3, 1952

INVENTOR
RANDOLPH S. RAE
BY
ATTORNEYS

United States Patent Office 2,995,007
Patented Aug. 8, 1961

2,995,007
RAMJET DIFFUSER

Randolph S. Rae, Silver Spring, Md., assignor to the United States of America as represented by the Secretary of the Navy
Filed Sept. 3, 1952, Ser. No. 307,633
2 Claims. (Cl. 60—35.6)

This invention relates generally to aerial missiles of the ramjet type and more particularly to the inner body nose configuration of an inclined-shock type ramjet diffuser.

Ramjet missiles of the type utilizing inclined-shock diffusers were found to exhibit the phenomenon of "buzz" or shock oscillation when operating at other than the design conditions. Shock oscillations seriously preclude the efficient operation of the missile diffuser. In addition, delicate guidance and telemetering instruments contained within the missile function incorrectly, and the missile as a whole functions improperly. The inclined-shock diffusers, when operating under design conditions, provide a far greater pressure recovery and are far more efficient than simple plane-shock diffusers. However, when the inclined-shock diffusers were operated at other than design conditions the effects of shock-oscillations were so serious as to make said diffusers unsuitable for use in ramjet missiles.

The phenomenon of shock oscillation occurs when the mass flow of air through the diffuser falls below a critical value. The mass flow of air is determined by the burning rate of the fuel and the speed of the missile. At supersonic speeds a high burning rate increases the back pressure within the combustion chamber causing the air in the diffuser to "pile-up," and, in the extreme instance, to flow out over the lip of the diffuser. The condition of air overflowing the diffuser, commonly known as "spillover," is responsible for pushing the shock wave, normally attached to the lip of the diffuser, forward away from said lip.

Concurrent with the "pile up" of air is an increase of pressure in the diffuser. When this pressure reaches a critical value, the boundary layer of relatively motionless air on the nose of the inner body of the diffuser moves outwardly away from said nose and interacts with the detached shock wave to cause shock oscillations.

Several attempts have been made to remove the causes of shock oscillation. One method that has achieved slight success is to bleed off the boundary layer of air through the inner body nose. Aside from only moderately extending the range of shock oscillation-free operation, the method is undesirable from the standpoint of space conservation, since additional apparatus must be installed in the limited space available in the missile.

It is, therefore, an object of the present invention to extend the range of shock oscillation-free operation of the inclined-shock type diffuser.

It is a further object of the invention to stabilize the boundary layer of air on the inner body nose of an inclined-shock type diffuser and thus extend the range of shock oscillation-free operation.

Figure 2:
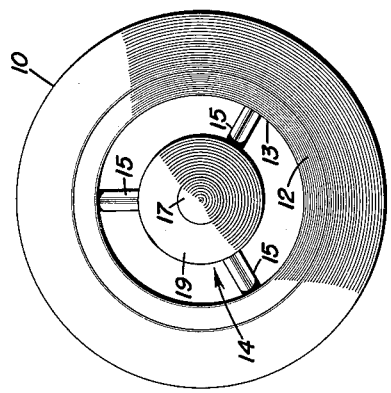

Further objects and advantages of the invention will become evident from the following detailed description of one embodiment thereof, taken in conjunction with the accompanying drawing, in which:

FIG. 1 is an axial section, partly in elevation, of a forward end portion of a ramjet missile embodying the invention; and FIG. 2 is a front end elevation of the missile shown in FIG. 1.

The present invention extends the range of shock oscillation-free operation of a ramjet missile beyond that ever achieved before by stabilizing the boundary layer of air on the inner body nose. This is accomplished by constructing the inner body nose with a stepped portion. The stepped portion provides a breaking point where the boundary layer, which begins to separate further back in the diffuser, breaks off. In this manner, the boundary layer on the inner body nose is stabilized. To cause a separation of the boundary layer forward of the stepped portion, a higher diffuser pressure is required. This can be achieved only by further increasing the rate of burning.

Referring now to FIG. 1, there is shown a forward end portion 9 of a ramjet missile, generally including an outer casing 10 and an inner casing 11 joined at their forward ends by a tapered annular ring 12 forming a lip 13, and an inner body 14 mounted by three struts 15 partially within a duct 16 defined by said inner skin. The remainder of the missile does not concern the present invention and therefore, is not shown. For further information regarding ramjet missiles, reference is made to the following publications: "The Ramjet as a Supersonic Propulsion Plant," by W. H. Goss and Emory Cook, S.A.E. Quarterly Transactions, Volume 2, Number 4, October 1948; and "Burners for Supersonic Ram-Jets," by James W. Mullen, Industrial and Engineering Chemistry, Volume 41, Number 1, September 1949.

The inner body 14 is constituted by a conical nose 17 having a base 18, an intermediate portion in the form of a frustum of a cone 19 having a small base 21 coincident with the base of said nose and a large base 22, and a body of revolution 23 having a plane circular leading face 24 in abutment with said large base and a tapered trailing portion 25. The large base 22 is of greater diameter than the circular face 24 of the body of revolution 23 and, hence, the cooperation of the frustum 19 and said body of revolution forms a step 26.

In operation, when the missile has attained supersonic speeds a strong conical shock wave is formed at the apex of the conical nose 17, and a weaker, frusto-conical shock wave is formed at the juncture of the base 18 of said nose and the small base 21 of the frustum 19. The two shock waves extend rearwardly and, at the design speed and combustion conditions, are attached to the lip 13 However, if the burning rate of fuel is increased at constant design speed, the pressure builds up within the duct 16 and pushes the shock waves forward away from the lip 13. Concurrently, when the pressure within the duct reaches a critical value, the boundary layer of relatively motionless air along the inner body 14 begins to strip away forwardly from the rearward portion of said inner body. When the stripping action reaches the step 26, the separated boundary layer to the rear of said step breaks away altogether from the inner body 14 and is swept back into the duct.

In this manner, it is seen that the boundary layer cannot separate from the nose 17 of the inner body and thus interact with the detached shock waves to produce shock-oscillations. If the pressure within the duct continues to rise until it reaches a value where the boundary layer forward of the step 26 strips off, then shock oscillation will commence. Nevertheless, it has been found that, by the provision of a step or breaking point on the intermediate portion of a ramjet inner body, the range of duct pressures that can be tolerated to permit shock oscillation-free operation is extended. Hence, a ramjet missile employing the present invention is capable of efficient performance at other than only design conditions.

The inner body 14 may be constructed other than as shown. For example, the frustum 19 may be dispensed with, and the conical nose 17 extended rearwardly to abut the face 24 of the body of revolution 23 and form the step, or additional frustums may be appropriately positioned as a part of the inner body. Whatever specific configuration is used, the step or breaking point must be retained.

Therefore, it is evident that various modifications of the invention are possible and that the foregoing detailed description is given by way of illustration and is not to be construed as a limitation upon the invention as defined by the appended claims.

What is claimed is:

1. In a ramjet diffuser having an outer casing providing a duct and an inner body including a nose and a body of revolution, said inner body being located partially within said duct, a stabilizer for minimizing the effects of back pressure surges tending to interfere with efficient supersonic compression, said stabilizer comprising a step formed at the intersection of said nose and said body of revolution by providing a nose of greater diameter than the diameter of said body of revolution at the point of intersection, said point of intersection being forward of the inlet to said duct.

2. A diffuser for a ramjet engine comprising, a body having a central duct, an inner body mounted coaxially in said duct, said inner body having a circular periphery outlining a plane frontal area at the forward end thereof, an intermediate portion constituted by a frustum of a right circular cone having a small base and a large base, said intermediate portion being carried coaxially with said inner body, said large base abutting against said frontal area of said inner body and having a diameter greater than the diameter of said frontal area, and a conical nose having its base congruent with said small base of said frustum.

References Cited in the file of this patent

UNITED STATES PATENTS

| | | |
|---|---|---|
| 2,540,594 | Price | Feb. 6, 1951 |
| 2,638,738 | Salter | May 19, 1953 |